(12) United States Patent
Pinder

(10) Patent No.: US 11,482,225 B2
(45) Date of Patent: Oct. 25, 2022

(54) SYSTEM AND METHOD FOR CONCURRENT OPERATION OF VOICE OPERATED SWITCH AND VOICE CONTROL WITH WAKE WORD

(71) Applicant: MOTOROLA SOLUTIONS, INC., Chicago, IL (US)

(72) Inventor: Ellis A. Pinder, Davie, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 249 days.

(21) Appl. No.: 17/020,937

(22) Filed: Sep. 15, 2020

(65) Prior Publication Data

US 2022/0084512 A1  Mar. 17, 2022

(51) Int. Cl.
*G10L 15/22* (2006.01)
*G10L 19/00* (2013.01)
*G10L 15/30* (2013.01)

(52) U.S. Cl.
CPC .............. *G10L 15/22* (2013.01); *G10L 15/30* (2013.01); *G10L 19/00* (2013.01); *G10L 2015/223* (2013.01)

(58) Field of Classification Search
USPC ..................................................... 704/1–504
See application file for complete search history.

(56) References Cited

U.S. PATENT DOCUMENTS

| 4,860,359 | A | 8/1989 | Eicher | |
|---|---|---|---|---|
| 6,477,150 | B1 * | 11/2002 | Maggenti | H04M 3/563 370/312 |
| 8,077,634 | B2 * | 12/2011 | Maggenti | H04W 12/069 370/260 |

(Continued)

FOREIGN PATENT DOCUMENTS

| KR | 200363811 Y1 | 10/2004 |
|---|---|---|
| KR | 200408555 Y1 | 2/2006 |

OTHER PUBLICATIONS

Amar Toor: "Developer creates prox server for Siri, controls Thermostat with his voice (video)", https://forum.universal-devices.com/topic/6920-voice-commands-using-siri-proxy/, Nov. 21, 2011, downloaded from the internet: Jul. 13, 2020, all pages.

(Continued)

*Primary Examiner* — Marcus T Riley

(57) ABSTRACT

A method is provided. The method includes enabling voice activated switch (VOX) mode on a communication device. The method further includes enabling a wake word detector on the communication device. The method also includes monitoring for voice activity using a voice activity detector (VAD). The method additionally includes detecting voice activity using the VAD, wherein detecting voice activity further includes: storing the voice activity in a buffer, determining, using the wake word detector, the presence or absence of a wake word in the voice activity, monitoring for and subsequently processing a voice command based on the determination of the presence of the wake word in the voice activity, and initiating a transmit operation, on the communication device, of the voice activity stored in the buffer based on the absence of the wake word in the voice activity.

17 Claims, 3 Drawing Sheets

(56) References Cited

U.S. PATENT DOCUMENTS

| | | | |
|---|---|---|---|
| 8,565,145 B2* | 10/2013 | Khan | H04L 25/20 370/315 |
| 2003/0012149 A1* | 1/2003 | Maggenti | H04W 12/069 370/260 |
| 2005/0203998 A1 | 9/2005 | Kinnunen et al. | |
| 2013/0210475 A1* | 8/2013 | Nylund | H04B 5/0006 455/518 |
| 2014/0257821 A1* | 9/2014 | Adams | G10L 25/48 704/275 |
| 2015/0340042 A1* | 11/2015 | Sejnoha | H04M 1/724 704/275 |
| 2018/0012593 A1* | 1/2018 | Prasad | G10L 15/08 |
| 2019/0371310 A1* | 12/2019 | Fox | G10L 15/26 |
| 2022/0084512 A1* | 3/2022 | Pinder | G10L 15/22 |

OTHER PUBLICATIONS

King, Melanie et al.: "Electronic Communications Device Having a User Interface Including a Single Input Interface for Electronic Digital Assistant and Voice Control Access", U.S. Appl. No. 16/834,660, filed Mar. 30, 2020, all pages.

* cited by examiner

SYSTEM AND METHOD FOR CONCURRENT OPERATION OF VOICE OPERATED SWITCH AND VOICE CONTROL WITH WAKE WORD

BACKGROUND

Communications devices, such as two-way radios (e.g. walkie talkies, etc.), are typically operated using a Push-to-Talk (PTT) button. In general, when the PTT button is activated, the user of the communications device gains control of the communications channel and may begin speaking. The user's speech is broadcast over the communications channel and all other users that are monitoring the communications channel are able to hear what the user has said.

In some scenarios, use of a PTT button may be inconvenient as it requires the user to use a finger on his hand to depress the PTT button, thus rendering that hand unavailable for other tasks. To overcome this deficiency, some devices implement a Voice Operated Switch (VOX) feature. When the VOX feature is active, the communications device monitors the audio environment in the vicinity of the user to detect speech. Upon detection of speech, the communications device activates the PTT button, just as if the user had pressed it manually. Thus, the user is able to activate PTT using his voice, leaving his hands free to engage in other tasks. Furthermore, because the communications device can discriminate between speech and other background noises, the VOX feature is not falsely triggered by background sounds.

Communications devices may also include parameters that may be controlled by physically manipulating various controls on the device. For example, the device volume may be set with a volume knob, the communications channel in use may be set via a channel selector knob, and various other features may be activated/deactivated by manipulation of inputs (e.g. buttons, knobs, switches, etc.) on the communications device. To reduce the amount of physical interaction required, a communications device may implement a Voice Control (VC) feature including a voice interface button (VIB). A user may simply press the VIB button and then speak a command to control the communications device (e.g. "volume up," "switch to channel x," "activate feature y," etc.). The communications device recognizes the command and then executes the desired function.

Although VC with VIB reduces the amount of physical interaction that is necessary with the communications device, it does not eliminate it. The user still must use his hand to activate the VIB, thus rendering his hand unusable for other tasks. To eliminate this problem, some communications devices have introduced VC with Wake Word (WW). A WW is very similar to the activation word found in many currently available digital assistants (e.g. "OK Google," "Alexa," "Hey Siri," etc.). The communications device may listen for a designated WW. Upon detection of the WW, the communications device listens for a voice command, just as if the VIB had been pressed. The communications device is thus able to receive voice commands while operating in a hands free mode.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments

Figure 1:
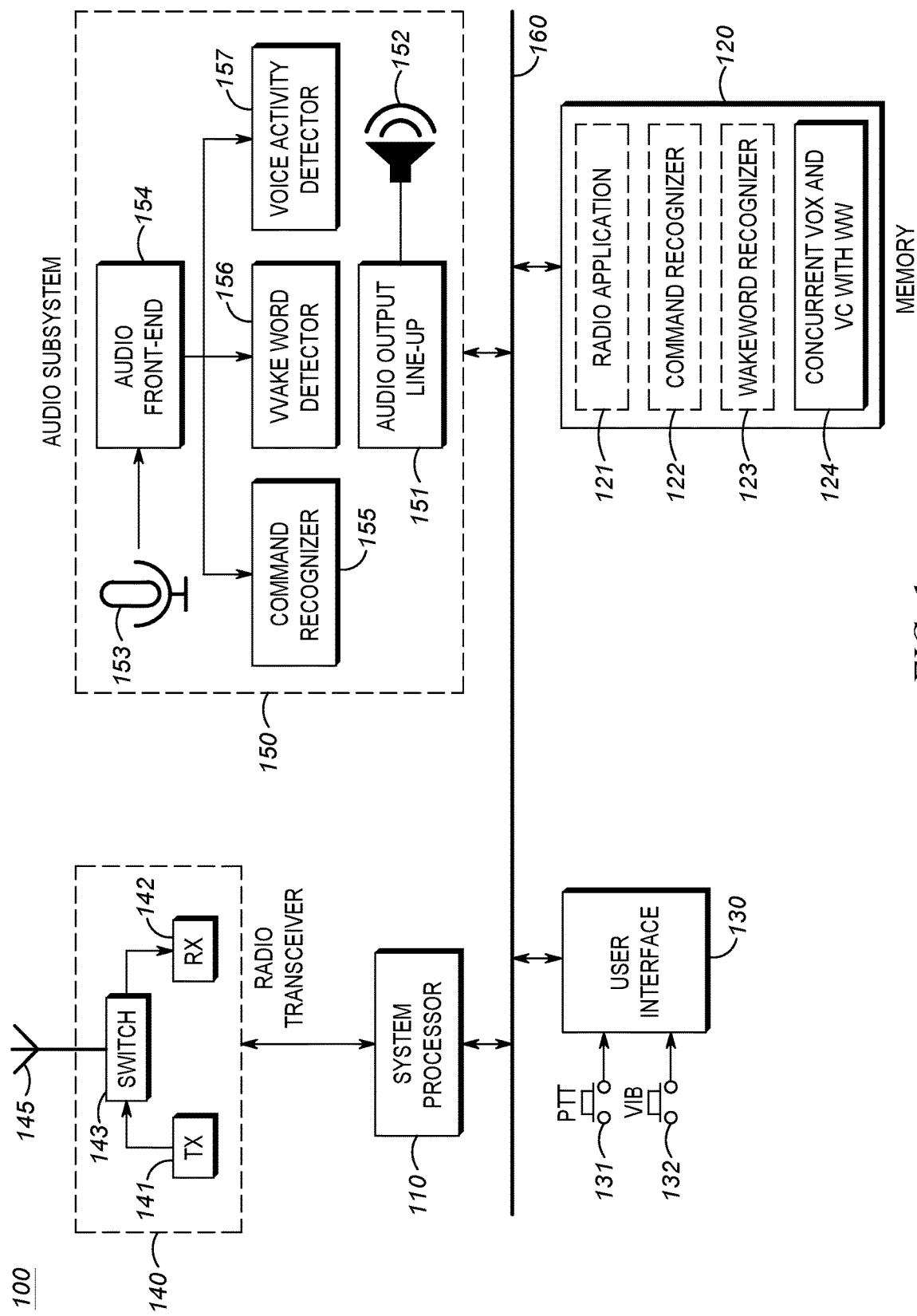
FIG. 1 is an example device that may implement the concurrent operation of voice operated switch and voice control with wake word techniques described herein.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Each of the Voice Operated Switch and Voice Control with Wake Word features described above allow a communications device to be operated in a hands free mode. A problem arises when both of these features are active on a single device at the same time. For example, if both features are active, and a user begins to speak, the VOX feature will immediately begin transmitting that speech over the air to all users who are monitoring the communications channel. However, if the user was speaking the Wake Word in order to issue a voice control command, he did not intend for the Wake Word to be communicated to the other users of the communications channel, but rather was intending that the device transition into a mode to receive a voice command.

The communications device cannot simply monitor the speech to detect the presence of the Wake Word and only begin transmitting if the wake word is not spoken because any speech prior to the detection of the Wake Word, assuming the Wake Word is spoken at all, would be lost and not transmitted to the other communications channel users. Discarding speech until it is determined that the Wake Word has not been spoken would result in an undesirable situation, as communications may be lost until it is determined that the Wake Word has not been spoken.

The techniques described herein overcome these problems and others, individually and collectively. When both the Voice Operated Switch and Voice Control with Wake Word features are active, the communications device monitors for voice activity using a voice activity detector. Upon detection of voice activity, the device begins buffering the received voice. Upon detection of the Wake Word, the device transitions to a Voice Control State. Subsequent speech may be processed as a voice command.

As the buffer fills with voice, it may be determined that the Wake Word is not present in the buffer, meaning that the speech was intended to be sent over the communications channel. The buffer may then be emptied by transmitting the stored speech over the communications channel, albeit slightly delayed from when the speech was originally spoken. In some implementations, the slight delay may be mitigated by performing compression on the outgoing speech, which has the effect of temporally speeding up the transmission of the buffered speech.

Further advantages and features consistent with this disclosure will be set forth in the following detailed description, with reference to the figures.

A method is provided. The method includes enabling voice activated switch (VOX) mode on a communication device. The method further includes enabling a wake word detector on the communication device. The method also includes monitoring for voice activity using a voice activity detector (VAD). The method additionally includes detecting voice activity using the VAD, wherein detecting voice activity further includes: storing the voice activity in a buffer, determining, using the wake word detector, the presence or absence of a wake word in the voice activity, monitoring for and subsequently processing a voice command based on the determination of the presence of the wake word in the voice activity, and initiating a transmit operation, on the communication device, of the voice activity stored in the buffer based on the absence of the wake word in the voice activity.

In one aspect, initiating the transmit operation of the voice activity stored in the buffer further comprises transmitting the voice activity stored in the buffer until the buffer is empty. In one aspect, initiating the transmit operation of the voice activity stored in the buffer further comprises performing time compression on the voice activity stored in the buffer to create an audio stream until the buffer is empty and transmitting the voice activity from the audio stream.

In one aspect, the wake word detector is integrated with the VAD. IN one aspect, the communications device is a land mobile radio, further comprising a half-duplex communication mode and a push-to-talk (PTT) button. In one aspect, initiating the transmit operation of the voice activity stored in the buffer further comprises outputting the voice activity without further wake word detection processing. In one aspect, VOX mode is voice activated Push-to-Talk (PTT).

A system is provided. The system comprises a processor and a memory coupled to the processor. The memory contains a set of instructions thereon that when executed by the processor cause the processor to enable voice activated switch (VOX) mode on a communication device. The instructions further cause the processor to enable a wake word detector on the communication device. The instructions further cause the processor to monitor for voice activity using a voice activity detector (VAD). The instructions further cause the processor to detect voice activity using the VAD. Detecting voice activity further comprises instructions to: store the voice activity in a buffer, determine, using the wake word detector, the presence or absence of a wake word in the voice activity, monitor for and subsequently processing a voice command based on the determination of the presence of the wake word in the voice activity, and initiate a transmit operation, on the communication device, of the voice activity stored in the buffer based on the absence of the wake word in the voice activity.

In one aspect, the instructions to initiate the transmit operation of the voice activity stored in the buffer further comprises instructions to transmit the voice activity stored in the buffer until the buffer is empty. In one aspect, the instructions to initiate the transmit operation of the voice activity stored in the buffer further comprises instructions to perform time compression on the voice activity stored in the buffer to create an audio stream until the buffer is empty and transmit the voice activity from the audio stream.

In one aspect, the wake word detector is integrated with the VAD. In one aspect, the communications device is a land mobile radio, further comprising a half-duplex communication mode and a push-to-talk (PTT) button. In one aspect, the instructions to initiate the transmit operation of the voice activity stored in the buffer further comprises instructions to: output the voice activity without further wake word detection processing. In one aspect, VOX mode is voice activated Push-to-Talk (PTT).

A non-transitory processor readable medium containing a set of instructions thereon is provided. The instructions, when executed by a processor cause the processor to enable voice activated switch (VOX) mode on a communication device. The medium includes instructions that cause the processor to enable a wake word detector on the communication device. The medium includes instructions that cause the processor to monitor for voice activity using a voice activity detector (VAD). The medium includes instructions that cause the processor to detect voice activity using the VAD. Detecting voice activity further comprises instructions to: store the voice activity in a buffer, determine, using the wake word detector, the presence or absence of a wake word in the voice activity, monitor for and subsequently processing a voice command based on the determination of the presence of the wake word in the voice activity, and initiate a transmit operation, on the communication device, of the voice activity stored in the buffer based on the absence of the wake word in the voice activity.

In one aspect, the instructions to initiate the transmit operation of the voice activity stored in the buffer further comprises instructions to transmit the voice activity stored in the buffer until the buffer is empty. In one aspect, the instructions to initiate the transmit operation of the voice activity stored in the buffer further comprises instructions to perform time compression on the voice activity stored in the buffer to create an audio stream until the buffer is empty and transmit the voice activity from the audio stream.

In one aspect the wake word detector is integrated with the VAD. In one aspect, the communications device is a land mobile radio, further comprising a half-duplex communication mode and a push-to-talk (PTT) button. In one aspect, the instructions to initiate the transmit operation of the voice activity stored in the buffer further comprises instructions to output the voice activity without further wake word detection processing.

FIG. 1 is an example device that may implement the concurrent operation of voice operated switch and voice control with wake word techniques described herein. Communications device 100 may be a device such as a portable two-way radio (e.g. walkie talkie) that includes both the VOX feature and VC with WW feature. Device 100 may include a system processor 110, a memory 120, a user interface 130, a radio transceiver 140, an audio subsystem 150, and a system bus 160.

Device 100 may include system processor 110 (for example, a microprocessor or another electronic device). The system processor may be coupled to the other elements of the device 100 via a system bus 160. System bus 160 may allow the various components of the device 100 to be communicatively coupled with each other.

System processor 110 may be coupled to a memory 120. The memory may contain a set of instructions thereon, that when executed by the system processor cause the system processor to implement the techniques described herein.

Memory 120 may be any form of memory that contains instructions executable by system processor 110. For example, memory 120 may include random access memory (RAM), read only memory (ROM), electronically erasable and programmable memory (EEPROM), flash memory, etc. In some implementations, memory 120 may be a non-transitory processor readable medium containing instructions thereon. The non-transitory processor readable medium may be an article of manufacture that embeds thereon the instructions executable by the processor to implement the techniques described herein. The instructions contained on memory 120 are described in further detail below.

Device 100 may include user interface 130. User interface 130 may include controls that are utilized by the user to interact with device 100. For example, user interface may include PTT button 131. PTT button 131 may be used by the user of the device 100 when he wishes to communicate with other members on the communications channel. The user may press the PTT button and, once granted control of the communications channel, begin speaking. Other users who are monitoring the communications channel may then receive the communication from the user. For the remainder of this description, the other users who are monitoring the communications channel may be referred to as the talkgroup. In other words, the talkgroup is the set of users who will receive communications from the device 100 when the device is transmitting on the communications channel.

The user interface 130 may also include a voice interface button 132. The VIB, as described above, may be utilized to notify the communications device 100 that the user wishes to provide a voice control command, and that the next words that are received will be a voice command.

User interface 130 may also include many other controls (not shown) that would typically be included in wireless communications device. For example, controls to change the volume level of the device, controls to change the communications channel that is used, a keypad, buttons to turn features on and off (e.g. VOX on/off button, VC on/off button, etc.). User interface 130 may also include one or more display screens and one or more LED indicators. For ease of description, the description of these additional user interface controls has been omitted. A person of skill in the art would recognize that the general types of user interface controls that would be provided on a communications device such as device 100.

Device 100 may also include a radio transceiver 140. Radio transceiver 140 may include a transmit subsystem 141 that may receive audio from the audio subsystem 150 via the system bus 160 and the system processor 160. The transmit subsystem may convert the audio stream to a radio frequency (RF) communication and transmit the audio stream to other members of the talkgroup via RF antenna 145. Radio transceiver 140 may also include receive subsystem 142. Receive subsystem 142 may receive RF communications (e.g. communications from other talkgroup members) via RF antenna 145. The receive subsystem may then output the received audio by sending the communications, via the system processor 110 and system bus 160 to the audio subsystem 150 for output.

Switch 143 allows transmit subsystem 141 and receive subsystem 142 to share a single antenna 145 for half-duplex communications. If device 100 is capable of supporting full duplex communication, then switch 145 may be replaced by a duplexer (not shown). A person of skill in the art would appreciate other arrangements of transceiver 140 and may further recognize that device 100 may contain other, possibly different, transceivers. The radio transceiver is shown within a dotted line because in some implementations, only the analog RF operations are performed by the radio transceiver 140, while baseband operations are performed by the system processor. For example, in a software radio implementation, audio is received from the audio subsystem, and all baseband processing is performed by the system processor 110. The baseband signal is then sent to the radio transceiver subsystem 140 for conversion to RF and transmission over the air interface. Likewise, received RF may be converted to baseband by the radio transceiver, and then sent to the system processor for further conversion back to audio for eventual playout by the audio subsystem 150. What should be understood is that the device 100 is able to communication with the talkgroup via RF transmissions.

For example, the radio transceiver 140 of communications device 100 may include one or more wireless protocols, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network.

Device 100 may also include audio subsystem 150. Audio subsystem 150 may allow the device to receive audio (e.g. speech, etc.) from the user and cause that audio to be transmitted to other members of the talkgroup. The audio subsystem 150 may also allow the user of the device 100 to hear audio communications from other members of the talkgroup.

Audio subsystem 150 may include audio output line-up 151. The audio output line-up 151 may include any and all components used to process received audio (e.g. digital signal processors, audio filters, audio amplifiers, etc.) prior to being output by a speaker 152. In other words, audio received from the talkgroup via the radio transceiver subsystem 140 may be output via a speaker 152 after being processed by the audio output line-up 151. Device 100 may include multiple speakers utilized concurrently or individually (not shown), including speakers on accessories external to device 100.

The audio subsystem 150 may also include a microphone 153 to receive sound in the vicinity of the device 100. The sound received by the microphone 153 may be processed by the audio front end 154. Audio front end 154 may include functionality such as filters, digital signal processors, etc. that may be used to preprocess and clean up sounds received from the microphone 153. Device 100 may include multiple microphones utilized concurrently or individually (not shown), including microphones on accessories external to device 100. A person with skill in the art will recognize that multiple microphones may be advantageously utilized for noise reduction.

The audio front end 154 may be coupled to several other elements that may be used to implement the techniques described herein. For example, the audio subsystem 150 may include a command recognizer 155. The command recognizer 155 may be used to detect voice commands in the received audio. Once recognized, those commands may be processed by the system processor. Voice commands may include commands such as commands to increase or decrease the volume, change the communications channel, or activate or deactivate a feature. The techniques described herein are not limited to any particular type of voice commands. What should be understood is that a voice command may be received and executed Audio subsystem 150 may also include wake word detector 156. Wake word detector 156 may be utilized to detect the presence of a wake word in the audio received from the microphone. As will be explained in further detail below, upon detection of the wake word, the device 100 may be made aware that the user is about to attempt to issue a voice command and that the audio received after the wake word is detected should be processed as a voice command.

Audio subsystem 150 may also include voice activity detector 157. Voice activity detector 157 may monitor the audio received form the microphone 153 via the audio front end 154 to detect the presence of voice as opposed to background sound (e.g. traffic, dogs barking, etc.). As will be described in further detail below, the detection of voice activity may trigger the device to execute the techniques described herein.

It should be noted that although command recognizer 155, wake word detector 156, and voice activity detector 157 have been described as three separate elements, this is for purposes of ease of description only. Any one or more of these pieces of functionality may be combined with any other. For example, in some implementations, the voice activity detector and wake word detector may be integrated as a single element. Furthermore, the techniques described herein are not limited by how the functionality is implemented. Implementations may include exclusive hardware implementations, exclusive software implementations, or implementations that are a combination of hardware and software. For example, command recognizer 155, wake word recognizer 156, and voice activity detector 157 could be implemented within system processor 110.

Memory 120 may include radio application instructions 121. When executed by the system processor, radio application instructions 121 may cause device 100 to implement the functionality of a two-way radio. Such functionality may include implementing a two way, half duplex communications channel with other members of a talkgroup using the audio subsystem 150 and radio transceiver subsystem 140. In other words, radio application instructions 121 may cause the device 100 to implement all functionality found in a typical wireless communications device, such as a walkie-talkie.

Memory 120 may also include command recognizer instructions 122. As explained above, command recognizer 155 may be implemented as a combination of hardware and software elements. Command recognizer instructions 122 may include the software portion of the implementation. Memory 120 may also include wake word detector instructions 123. Wake word detector instructions may allow the device 100 to detect the presence of a wake word in audio received from the audio subsystem 150.

Memory 120 may also include concurrent VOX and VC with WW instructions 124. The concurrent VOX and VC with WW instructions 124 may allow the device 100 to implement the techniques described herein wherein both the voice operated switch and voice command with wake word features are both active at the same time. Operation of instructions 124 is described in further detail with respect to FIGS. 2 and 3.

Figure 2:
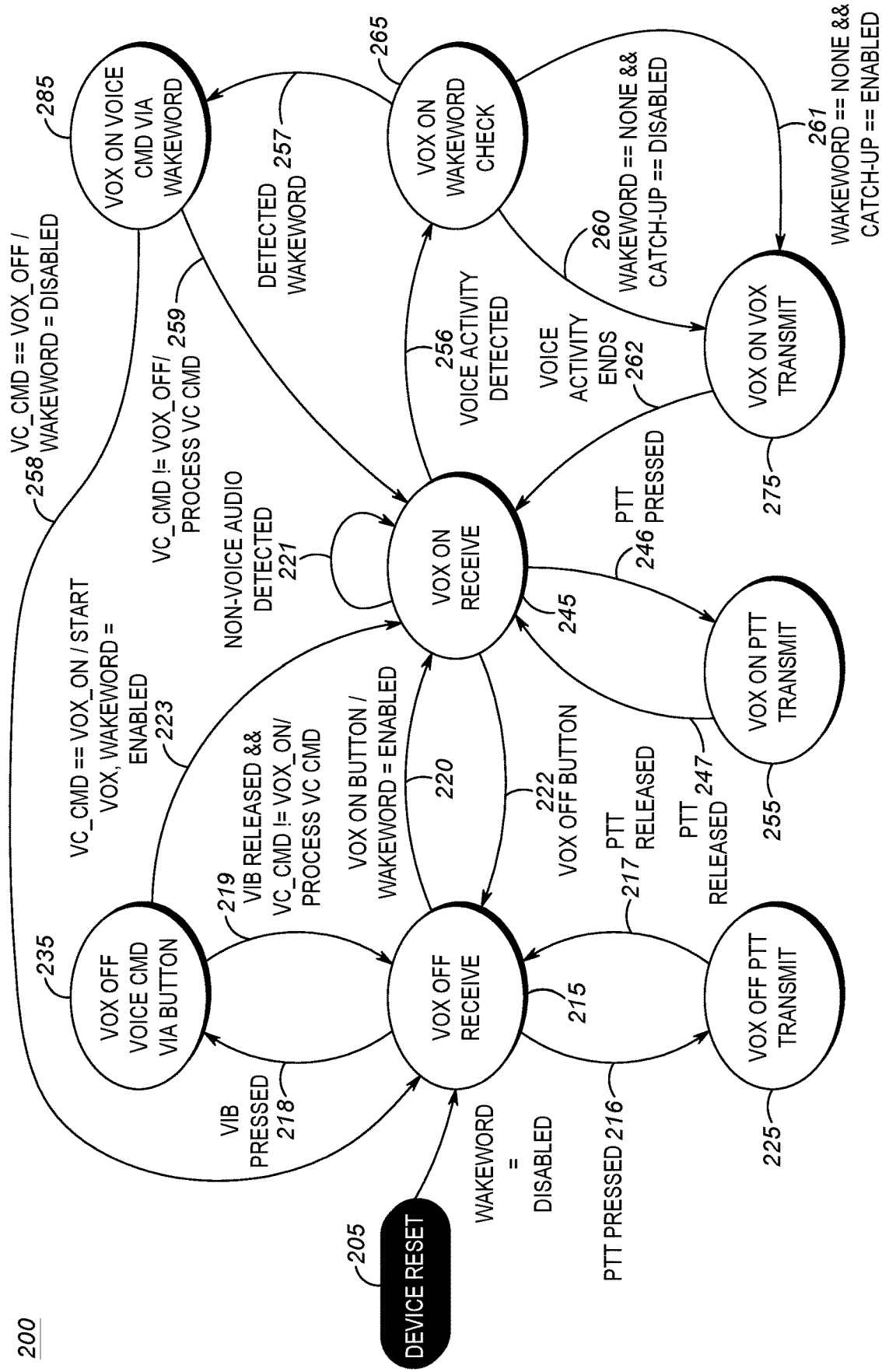
FIG. 2 is an example of a portion of a finite state machine that may implement the concurrent operation of voice operated switch and voice control with wake word techniques described herein.

FIG. 2 is an example of a portion of a finite state machine (FSM) 200 that may implement the concurrent operation of voice operated switch and voice control with wake word techniques described herein. Upon device reset 205, FSM 200 may move to state 215, in which neither the VOX feature nor the VC with WW feature is enabled. In state 215, the device may be in a receive mode, waiting for communications from the talkgroup. When in the receive state, received communications from the talkgroup may be output over the device audio output.

If the PTT button is pressed 216, FSM 200 moves to state 225. In state 225, VOX remains off, and the device enters the PTT transmit mode. In the PTT transmit mode, audio is received via the audio front end and is transmitted to the talkgroup over the communications channel. This process continues until the PTT button is released 217, at which point the FSM 200 returns to the VOX Off, Receive state 215. The transitions between states 215 and 225 are basic PTT operation meaning that when PTT button is pressed, audio is transmitted to the talkgroup and when the PTT is released, any audio received from the talkgroup is output.

When in state 215, if the VIB button is pressed 218 this indicates that the user is attempting to issue a voice command to the communications device. FSM 200 moves to state 235, in which VOX remains off, and the device is awaiting a voice command, because the VIB button was pressed. The voice command may be received from the user while in state 235 while the VIB button is depressed. Once the VIB is released, the voice command may be processed.

If the voice command received in state 235 is not a command to turn the VOX feature on 219, FSM 200 processes the voice command (e.g. raise/lower volume, change channel, etc.) and returns to state 215. If the voice command is a command to turn the VOX feature on and the WW has been enabled 223, the FSM moves to state 245 in which the WW has been enabled and the VOX feature is on. The VOX on, receive state 245 is similar to the VOX off receive state 215, with the exception that the VOX feature is on and the WW is enabled.

There is an alternative path for entering the VOX on, receive state 245. If in VOX off, receive state 215, the VOX feature is turned on 220 via a user interface action (e.g. pressing a VOX button on the device), with the WW enabled, FSM 200 also moves to state 245.

For the sake of ease of description, states in which WW is enabled, but the VOX feature remains off have been omitted. What should be understood is that the techniques described herein generally apply to the case where both the VOX feature and VC with WW feature are active at the same time. When the features are not active at the same time, there is no interaction and the features operate individually as has been described above.

In state 245, the VOX feature is on and VC with WW is enabled. If non-voice audio is detected 221 by the audio subsystem of the device, FSM 200 simply returns to state 245 without taking any action. As explained above, the VAD of the device is able to discriminate between audio that is human speech and other audio (e.g. background noise, etc.). If the VOX feature is disabled 222 (e.g. by pressing a button on the device to turn the feature off) and the VC with WW feature is disabled, FSM 200 returns to state 215 in which the VOX feature and VC with WW features are disabled and the device is waiting to receive audio from the talkgroup. For ease of description, the state where VOX is turned off, but VC with WW remains on has been omitted. As explained above, VC with WW would operate normally as described above when the VOX.

When in state 245, even though VOX is active, the device may still be operated by using the PTT button. If the PTT button is pressed 246, FSM 200 moves to state 255 in which VOX is on, and the device begins transmitting received audio to the talkgroup. This is effectively the same operation as described with respect to state 225. When the PTT button is released 247, FSM returns to state 245, in which VOX is on, and the device receives any transmissions from the communications channel and outputs it using the audio output line up.

If voice activity is detected 256, FSM 200 moves to state 265. Voice activity may be detected by the VAD of the device. As mentioned above, the VAD is able to distinguish between voice and background noise. In state 265, VOX is on and the device begins checking the received audio for the WW. While in state 265, the received voice activity is buffered while the check for the WW occurs. In some implementations, the buffer is a circular buffer. Use of a circular buffer allows the buffer to utilize a fixed, known quantity of memory to buffer the received voice activity. The techniques described herein are not limited to any particular type of buffer. What should be understood is that in state 265, voice activity is buffered while the device checks for the presence of the WW.

If the WW is detected 257 while in state 265, FSM 200 move to state 285. In state 285, the VOX feature is on and the device waits for a VC. If the VC is to turn VOX off and disable WW 258, FSM 200 returns to state 215, which has been described above. Otherwise, if the VC is not to turn VOX off 259, the received VC command is executed (e.g. change volume, change channel, etc.) and the FSM returns to state 245

As the buffer fills with voice activity in state 265, and it is determined that the buffered voice does not include the WW, the buffer may be emptied by sending the buffered voice activity over the communications channel to the members of the talkgroup. If the WW is not detected and the catchup feature is disabled 260, the FSM moves to state 275 in which the VOX feature is on and the buffered audio is transmitted, without modification, over the communications channel to members of the talkgroup. It should be understood that because the voice activity is buffered, there will be a slight delay between when the voice activity starts and the voice is transmitted. For example, if the buffer is sized to store two seconds worth of voice activity, there may be up to a two second delay between the start of voice activity and when it is transmitted from the device via the communications channel.

In order to mitigate the delay, some implementations may include a catch-up feature in which the buffered audio is sped up prior to transmission. For example, the buffered audio may be output faster than the rate at which it was captured. Speeding up the output of the voice activity may result in an increase in pitch of the audio that is output. The pitch of the audio output may be adjusted to account for the rise in pitch die to speeding up the audio output.

When in state 265, if the WW is not detected and the catch-up feature is enabled 261, FSM moves to state 275. Just as explained above, in state 275 the buffered audio output is transmitted by the device over the communications channel. However, in the case that the catch-up feature is enabled, the output of the buffered audio is sped up in order to compensate for the delay introduced by buffering the audio in state 265.

One thing that should be understood is that while in state 265 and a wake word is not detected, regardless of if the catch-up feature is enabled or not, the audio output is transmitted over the communications channel for receipt by other members of the talkgroup. The audio output is not further processed for detection of voice commands, wake words, or keywords, either locally or at a remote processing system. Rather, the audio output is sent over the communications channel for receipt and playout via the communications devices of the other talkgroup members. While in state 275, once the audio buffer has been emptied, and voice activity ends 262, FSM 200 moves to state 245. In state 245, the VOX feature is on, and the device waits to receive audio from the communications channel.

It should again be noted that FIG. 2 depicts only a portion of the finite state machine. The techniques described herein relate to the interaction between the VOX feature and the VC with WW feature. Thus, states that do not involve such interaction have been omitted. For example, states where VOX is off, but VC with WW is on have been omitted, as there is no interaction between the features.

Figure 3:
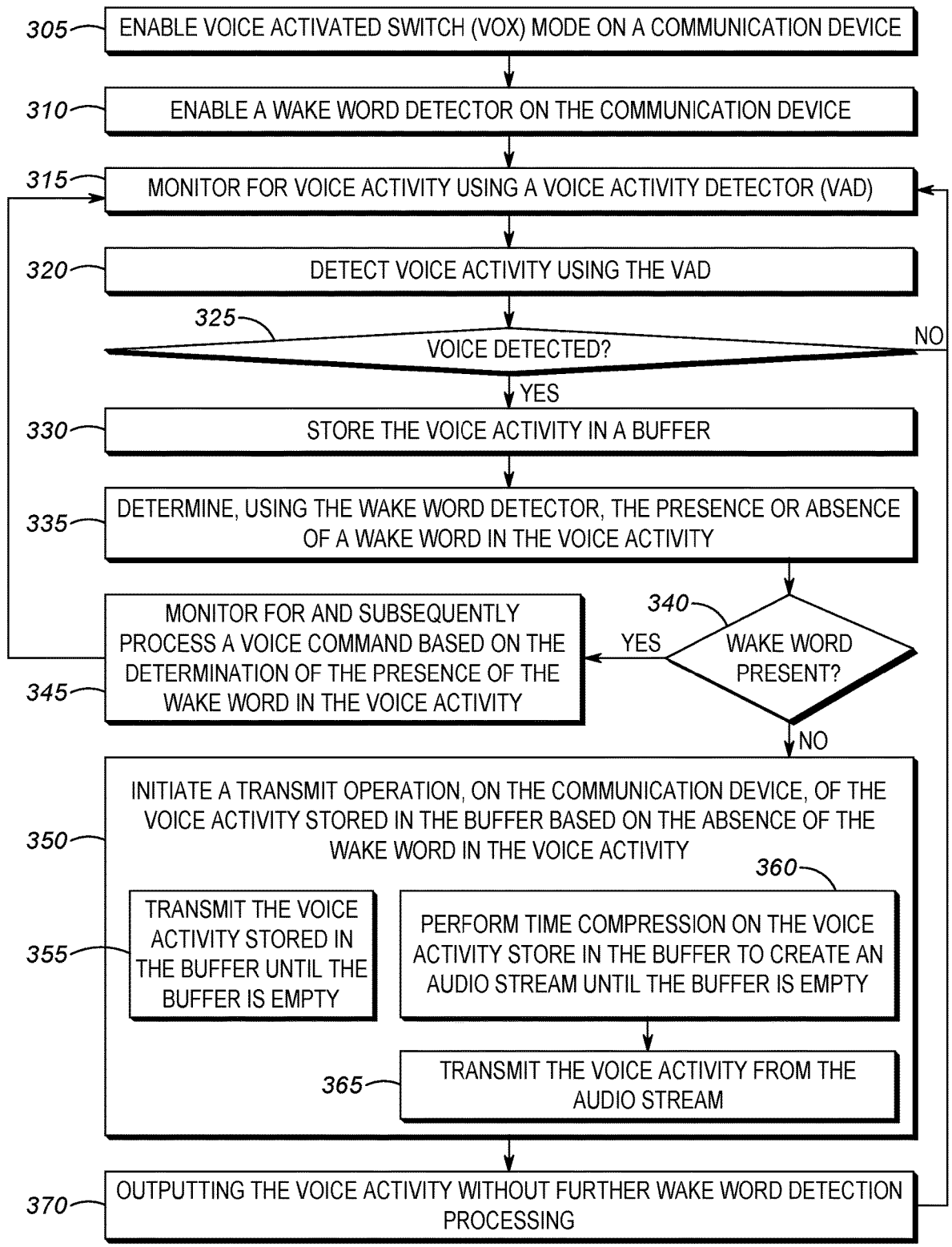
FIG. 3 is an example flow diagram for an implementation of the concurrent operation of voice operated switch and voice control with wake word techniques described herein.

FIG. 3 is an example flow diagram for an implementation of the concurrent operation of voice operated switch and voice control with wake word techniques described herein. In block 305, the voice activated switch (VOX) mode of a communications device may be enabled. As described above, the mode may be enabled by interacting with the user interface of the communications device (e.g. pressing a VOX on button, etc.) or in response to a voice command. Regardless of how enabled, the VOX mode on the communications device is turned on.

In block 310, a wake word detector on the communications device may be enabled. The WW detector may be a standalone module or may be integrated with another module. For example, the WW detector may be integrated with a voice activity detector. What should be understood is that a WW detector, regardless of how/where implemented is enabled on the communications device.

In block 315 voice activity may be monitored using a voice activity detector (VAD). The VAD is able to distinguish between actual spoken voice and other sounds. Thus, the VAD is triggered when it detects human speech, but does not respond to other sounds (e.g. traffic noise, dogs barking, etc.).

In block 320, the VAD may detect the presence of voice activity. For example, the VAD may receive sounds form the audio front end of the communications device (e.g. from the microphone of the device, etc.). The VAD may determine if the sound received is human speech or some other sound in block 325. If the VAD determines that the sound is not human speech, the process returns to block 315, in which the VAD continues monitoring for voice activity. If the VAD does detect voice activity, the process proceeds to block 330.

In block 330, the detected voice activity may be stored in a buffer. As explained above, the voice activity is stored in a buffer because it cannot be immediately sent over the communications channel without first determining if the WW is present. If the WW is present, that is voice activity that was not intended to go over the communications channel. In some cases, the buffer may be implemented as a circular buffer in order to ensure a finite amount of storage space is used for the buffer and that there is no worry that the buffer may run out of space. However, the techniques described herein are not limited to any particular type of buffer.

In block 335, the presence or absence of a wake work in the voice activity may be determined using a wake word detector. There are many well-known techniques for determining the presence or absence of a WW within speech. The techniques described herein may be utilized with any currently available or later developed technique for WW detection. Furthermore, the techniques described herein are not dependent on any particular implementation of the WW detector. As explained above, in some implementations, the WW detector may be a stand-alone hardware or software module, while in other implementations, the WW detector may be integrated with other functionality (e.g. VAD, etc.).

What should be understood is that the presence or absence of the WW in the voice activity is detected.

In block 340, when the WW is determined to be present in the voice activity, the process moves to block 345. In block 345, the voice activity is monitored for and subsequently processes a voice command based on the presence of the WW in the voice activity. In other words, once it has been determined that the WW has been spoken, the device waits for a voice command to be spoken. When the voice command is received, the device executes that voice command (e.g. change volume, change channel, etc.). The process then returns to block 315, where monitoring the voice activity using a VAD continues.

When it is determined in block 340 that the wake word is absent, the process moves to block 350. In block 350, a transmit operation may be initiated on the communications device of the voice activity stored in the buffer based on the absence of the wake word in the voice activity. In other words, if the WW is not detected in the voice activity, this means that the voice activity was not intended to be a voice command, but was rather intended to be transmitted over the communications channel via the VOX feature.

In one implementation, the voice activity in the buffer is simply transmitted from the buffer until the buffer is empty. In block 355 the voice activity stored in the buffer may be transmitted until the buffer is empty. In other words, as it is determined that the wake word is not present in the buffer, the portion of voice activity may be transmitted on the communications channel. Once the voice activity ceases, eventually the buffer will empty, as no additional voice activity will be added to the buffer. It should be understood that although there may be a delay between when the voice activity is spoken and when it is transmitted, there is no loss of the voice activity. All the voice activity is transmitted, albeit slightly delayed to account for the time necessary to detect the WW.

In another implementation, in order to mitigate the effects of the delay introduced by the buffering of voice activity, time compression may be performed on the buffered audio prior to transmitting. In one example method of time compression, the audio is sped up prior to transmitting. To mitigate the subsequent rise in pitch that inherently accompanies speeding up audio, the audio may be processed to adjust the pitch to a lower frequency. However, it should be understood that the adjustment of the pitch is not necessary. In yet another form of time compression, the buffered audio may be modified such that any period of silence (e.g. time between words, etc.) are removed. Even though such mitigation efforts may not completely eliminate the delay caused by buffering, the delay may at least be reduced.

In block 360, time compression may be performed on the voice activity stored in the buffer to create an audio stream until the buffer is empty. As it is determined that the WW is not included in the buffered audio, that audio may be compressed and included in an audio stream. In block 365, the voice activity may be transmitted from the audio stream. In other words, the device may transmit the voice from the buffer to the other members of the talkgroup.

In block 370, the voice activity may be output without further wake word detection processing. What should be understood is that once the audio from the buffer is output, either with or without time compression, no further processing is done to detect a wake word, a voice command, or any other such analysis. The buffered audio is simply output on the communications channel, just as it would have been had the VC with WW feature not been activated.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot [include a particular function/feature from current spec], among other features and functions set forth herein).

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:
1. A method comprising:
enabling voice activated switch (VOX) mode on a communication device;
enabling a wake word detector on the communication device;
monitoring for voice activity using a voice activity detector (VAD); and detecting voice activity using the VAD, wherein detecting voice activity further comprises:
storing the voice activity in a buffer;
determining, using the wake word detector, a presence or absence of a wake word in the voice activity;
monitoring for and subsequently processing a voice command based on the determination of the presence of the wake word in the voice activity; and
initiating a transmit operation, on the communication device, of the voice activity stored in the buffer based on the absence of the wake word in the voice activity, wherein initiating the transmit operation of the voice activity stored in the buffer further comprises transmitting the voice activity stored in the buffer until the buffer is empty.

2. The method of claim 1 wherein initiating the transmit operation of the voice activity stored in the buffer further comprises:
performing time compression on the voice activity stored in the buffer to create an audio stream until the buffer is empty; and
transmitting the voice activity from the audio stream.

3. The method of claim 1 wherein the wake word detector is integrated with the VAD.

4. The method of claim 1 wherein the communications device is a land mobile radio, further comprising a half-duplex communication mode and a push-to-talk (PTT) button.

5. The method of claim 1 wherein initiating the transmit operation of the voice activity stored in the buffer further comprises:
outputting the voice activity without further wake word detection processing.

6. The method of claim 1 wherein VOX mode is voice activated Push-to-Talk (PTT).

7. A system comprising:
a processor; and
a memory coupled to the processor, the memory containing a set of instructions thereon that when executed by the processor cause the processor to:
enable voice activated switch (VOX) mode on a communication device;
enable a wake word detector on the communication device;
monitor for voice activity using a voice activity detector (VAD); and
detect voice activity using the VAD, wherein detecting voice activity further comprises:
store the voice activity in a buffer;
determine, using the wake word detector, a presence or absence of a wake word in the voice activity;
monitor for and subsequently processing a voice command based on the determination of the presence of the wake word in the voice activity; and
initiate a transmit operation, on the communication device, of the voice activity stored in the buffer based on the absence of the wake word in the voice activity, wherein the set of instructions to initiate the transmit operation of the voice activity stored in the buffer further comprises instructions to transmit the voice activity stored in the buffer until the buffer is empty.

8. The system of claim 7 wherein the instructions to initiate the transmit operation of the voice activity stored in the buffer further comprises instructions to:
perform time compression on the voice activity stored in the buffer to create an audio stream until the buffer is empty; and
transmit the voice activity from the audio stream.

9. The system of claim 7 wherein the wake word detector is integrated with the VAD.

10. The system of claim 7 wherein the communications device is a land mobile radio, further comprising a half-duplex communication mode and a push-to-talk (PTT) button.

11. The system of claim 7 wherein the instructions to initiate the transmit operation of the voice activity stored in the buffer further comprises instructions to:
output the voice activity without further wake word detection processing.

12. The system of claim 7 wherein VOX mode is voice activated Push-to-Talk (PTT).

13. A non-transitory processor readable medium containing a set of instructions thereon that when executed by a processor cause the processor to:
enable voice activated switch (VOX) mode on a communication device;
enable a wake word detector on the communication device;
monitor for voice activity using a voice activity detector (VAD); and
detect voice activity using the VAD, wherein detecting voice activity further comprises:
store the voice activity in a buffer;
determine, using the wake word detector, a presence or absence of a wake word in the voice activity;
monitor for and subsequently processing a voice command based on the determination of the presence of the wake word in the voice activity; and
initiate a transmit operation, on the communication device, of the voice activity stored in the buffer based on the absence of the wake word in the voice activity, wherein the set of instructions to initiate the transmit operation of the voice activity stored in the buffer further comprises instructions to transmit the voice activity stored in the buffer until the buffer is empty.

14. The medium of claim 13 wherein the instructions to initiate the transmit operation of the voice activity stored in the buffer further comprises instructions to:
perform time compression on the voice activity stored in the buffer to create an audio stream until the buffer is empty; and
transmit the voice activity from the audio stream.

15. The medium of claim 13 wherein the wake word detector is integrated with the VAD.

16. The medium of claim 13 wherein the communications device is a land mobile radio, further comprising a half-duplex communication mode and a push-to-talk (PTT) button.

17. The medium of claim 13 wherein the instructions to initiate the transmit operation of the voice activity stored in the buffer further comprises instructions to:
output the voice activity without further wake word detection processing.

* * * * *